Patented Dec. 3, 1946

2,411,904

UNITED STATES PATENT OFFICE 2,411,904

ROSIN ESTER MODIFIED DICARBOXYLIC ACID-GLYCOL RESIN

George Spiller, Wilmington, Del., assignor to Hercules Powder Company, Wilmington, Del., a corporation of Delaware No Drawing. Application June 12, 1943, Serial No. 490,645

18 Claims. (Cl. 260—26)

This invention relates to synthetic resins and to articles coated therewith. More particularly, the resins are reaction products of glycols, alpha-beta unsaturated polybasic acids, and monohydric alcohol-rosin esters.

It has long been desired to coat articles, especially paper or textile webs with a molten composition which, upon cooling, would form a flexible film. Coating with molten compositions avoids the losses and hazards of coating with solvent solutions. However, coating materials having the desired film properties have not had the required properties for molten coating.

Flexible film-forming materials such as cellulose derivatives are much too viscous, even when plasticized, at any temperature below their decomposition points to be easily coated in thin films. Some of the solid fusible alkyd resins are capable of cooling from the molten state to form fairly flexible coatings but usually alkyd resins having this property also have the property of curing, i. e., of forming infusible, insoluble gelled masses upon being heated more than a few minutes. Coating with such resins is impractical since they change rapidly in viscosity on heating and soon form gels in coating equipment. Hard resins such as many of the natural resins, ester gums, and some of the synthetic resins are stable in the molten state, but on cooling form very brittle coatings which cannot properly be termed films as they are not capable of self-support.

Thus, there has been no satisfactory coating material which could be held freely molten but without change for long periods in coating equipment and which at the same time cooled to pale, durable, flexible films. Furthermore, there has been no coating material stable in the freely molten state at practicable coating temperatures which could be cured to an infusible, solvent-resistant state after coating.

In accordance with this invention there is prepared a resinous product which is fluid at practicable coating temperatures, which is highly stable to heat at such coating temperatures, which upon cooling forms flexible films and which can be cured to an infusible state at high temperatures. This product is prepared by reacting a dihydric alcohol with an alpha-beta unsaturated dicarboxylic acid such as maleic acid or anhydride until the acid number of the reaction mixture is within a certain range, and then reacting the resulting acid ester product further with a monohydric alcohol ester of an unsaturated rosin acid by heating at above 200° C. until a homogeneous resinous product having an acid number below about 50, and which is curable at a temperature of 200° C. but substantially permanently thermoplastic at below 150° C., is obtained.

In this process, the dicarboxylic acid or anhydride and the dihydric alcohol are heated together in a first reaction stage until the acid number of the mixture drops to a value between about 30 and about 150 as determined by the phenol red method, the reaction stage being terminated in all cases before a gel is formed. The first stage is terminated, usually by mere addition of the monohydric alcohol-rosin acid ester, and the reaction is continued in a second reaction stage with the intermediate product in admixture with the rosin acid ester by heating to and at a temperature between about 200° C. and 300° C. until the acid number of the resinous product is below about 50 and the cure time at 200° C. is below four minutes after cooling the product.

All acid numbers herein referred to are determined by the phenol red method described in detail at the end of this specification, unless specific reference is made to other methods. The phenol red method is used to insure proper control of the first reaction stage. It gives somewhat lower acid number results than the more usual phenolphthalein method but has a sharp endpoint at high acid numbers at which the phenolphthalein method has a fading unreproducible endpoint. "Cure time" is determined as described at the end of this specification. A cure time of less than four minutes at 200° C. is indicative of a resin which can be thermally set or cured; a cure time of more than five minutes by the described method indicates permanent thermoplasticity and inability to be cured by heat in any practicable period of time.

The resinous products in accordance with this invention are to be distinguished from resins prepared from the same reactants in the same general proportions by heating all the reactants together, or by first reacting a rosin or rosin ester with an alpha-beta unsaturated acid or anhydride such as maleic anhydride. Such products are permanently thermoplastic and of different molecular organization as shown by cure times of above five minutes even when heated for prolonged periods to low acid numbers which drop no further in preparation of the resin. They are in general less flexible and are considerably higher in color.

The examples following illustrate typical procedures in accordance with the invention. In the examples, all parts are by weight unless otherwise specified.

*Example 1*

A mixture of 98 parts of maleic anhydride and 75 parts of ethylene glycol was charged into an oil-jacketed glass-lined kettle equipped with an agitator. The mixture was heated from room temperature to a temperature of 170° C. over a period of 3½ hours. At this point the acid number by the phenol red method was 68. Heating was continued for an additional 45 minutes during which the temperature rose to 190° C. and the acid number dropped to 47. At this point 320 parts of methyl ester of wood rosin acids were added, 10 minutes being required for the addition. The mixture was then further heated, the temperature rising to 200° C. in one hour and to 240° C. in an additional two hours. The mixture was held at 240–250° C. for an additional two hours during which the cure time of the mixture was periodically determined. At the end of this period the cure time was found to be 95–110 seconds. During the last hour of preparation the molten material was sparged with carbon dioxide. The resin was poured into containers having a capacity of approximately 45 pounds and permitted to cool therein. The material finally obtained by this procedure had a cure time of about 95 seconds, an acid number by the phenol red method of eight (acid number by the phenolphthalein method of 10), and a drop melting point of 74.5° C. A sample of the resin placed in a container and maintained at 150° C. for 15 hours was fluid (uncured) at the end of the test period. The material so heated had a drop melting point of 79° C. and an acid number of eight by the phenol red method.

*Example 2*

A reaction mixture containing 294 parts of maleic anhydride and 223 parts of ethylene glycol was heated to 200° C. under an atmosphere of carbon dioxide over a period of two hours and held at 200° C. for one additional hour. Nine hundred sixty parts of methyl abietate heated to 200° C. were then added and the temperature of the mixture raised over a one-hour period to 270° C. and held there for three hours. The resulting material was evacuated at 250° C. and seven milliliters of mercury absolute pressure for 3¾ hours and the material then permitted to cool. The resin obtained had a drop melting point of 115° C., an acid number of 13 by the phenol red method (17 by the phenolphthalein method), a Lovibond color of 34 Amber, and a cure time of 50–60 seconds.

*Example 3*

A mixture of 196 parts of maleic anhydride and 330 parts of triethylene glycol was heated under a carbon dioxide atmosphere to 200° C. in a period of 1½ hours and held at that temperature for an additional 1½ hours. Six hundred forty parts of methyl ester of wood rosin acids at 200° C. were then added to the reaction mixture and the temperature of the resulting mixture was raised to 270° C. in one hour. The mixture was reacted for 2¾ hours at 270° C., during the last ½ hour of which it was sparged with carbon dioxide. The resulting resin was then cooled. It had an acid number of 15 by the phenol red method (18.5 by the phenolphthalein method), a drop melting point of 39° C., a Lovibond color of 37 Amber, and a cure time of 70 seconds.

*Example 4*

A glass-lined oil-jacketed reaction kettle equipped with an agitator was charged with 98 parts of maleic anhydride and 116 parts of diethylene glycol and the resulting mixture was heated for four hours, during which the temperature rose from 25° C. to 195° C. and the acid number by the phenol red method dropped to 70. At this point 320 parts of methyl ester of wood rosin acids were added to the mixture. This addition required approximately ½ hour and lowered the temperature of the reaction mixture to 165° C. Heating was continued for 2½ hours with agitation. The temperature rose to 240° C. in the first two hours and was maintained between 240 and 250° C. during the remaining time. Cure times were determined periodically during the last hour of reaction during which the cure time dropped from 100 seconds to 45 seconds. The resulting resin was then poured into containers having a capacity of about 45 pounds and permitted to cool therein. It may be mentioned that during both reaction stages the reaction mixture was cloudy, indicating the presence of two phases. Agitation was maintained through the preparation. The mixture became clear about 30 minutes before completion of the preparation reaction in the kettle. The final material had a cure time of 40 seconds, an acid number of 17.8 by the phenol red method (22.7 by the phenolphthalein method), and a drop melting point of about 60° C.

*Example 5*

A mixture of 348 parts of fumaric acid and 223 parts of ethylene glycol was heated together in glass-lined equipment under agitation for 1½ hours during the first hour of which the temperature rose from 30° C. to 200° C. and during the last ½ hour of which the temperature remained at 200° C. The acid number at this point was 122 by the phenol red method. Nine hundred sixty parts of the methyl ester of wood rosin were added and the mass was then heated to 260° C. for 20 minutes and held at 260° C. for three hours during the last hour of which the mass was sparged with $CO_2$. The resin was then poured into containers and cooled. The cure time at the end of the heating period was 64 seconds. The resin obtained upon cooling had an acid number of 15, a cure time of 50 seconds, a drop melting point of 85° C. and a Lovibond color of 32 Amber.

The examples illustrate the use of maleic anhydride and fumaric acid in the preparation of the product according to this invention. However, any alpha-beta unsaturated dicarboxylic acid or the anhydride of such acid may be substituted. Thus, maleic acid, maleic anhydride, fumaric acid, itaconic acid and the like are suitable. It will be understood that where the expression "alpha-beta unsaturated dicarboxylic acid" is used herein and in the claims it will be inclusive of the acid in the free carboxylic form or in the form of the carboxylic anhydride.

The dihydric alcohol utilized in the method according to this invention may be any glycol or other dihydric alcohol. Preferably, the more available glycols such as ethylene glycol, diethylene glycol, triethylene glycol, and propylene glycol are utilized for economy. However, instead of these materials, trimethylene glycol, butylene glycol, amylene glycol, 1,4-dihydroxy butane, tetraethylene glycol, hexaethylene glycol, nonaethylene glycol, phenolethylene glycol and the like have been found suitable.

The monohydric alcohol-rosin ester employed in accordance with this invention is illustrated in the examples by methyl abietate which is most readily available. Instead of methyl abietate, any monohydric ester of an unsaturated rosin or rosin acid mixture may be utilized. Thus, for example, the esters of gum rosin, wood rosin, isolated rosin acids, abietic acid, pimaric acid, sapinic acid, and the like with ethyl alcohol, isopropyl alcohol, butyl alcohol, isobutyl alcohol, amyl alcohol, capryl alcohol, lauryl alcohol, benzyl alcohol and chloroethyl alcohol have, for example, been found suitable in the process.

As shown by the examples the preparation reaction is carried out in two distinct stages. In the first stage the dihydric alcohol and the alpha-beta unsaturated dicarboxylic acid are heated together at a temperature between about 100° C. and about 250° C., preferably, at a temperature between about 160° C. and about 210° C., until the acid number of the mixture has dropped to a value below about 150 but above about 30 by the phenol red method. Preferably, the mixture is brought to an acid number between 50 and 100. The phenol red method of determining acid numbers is utilized for control since the determination is reproducible whereas other acid number methods such as titration with a phenolphthalein indicator give varying results from test to test because of a fading or shifting endpoint. The time required for this reaction stage varies from about 0.25 to about 10 hours, depending on the temperature used and the size of the mass of material being heated. Where higher temperatures in the range are used and the mass is capable of being rapidly heated, the time required for the reaction is relatively short. In no case will the reaction be continued for a sufficiently long time to cause gelation of the reaction mixture in this stage.

The quantity of the dihydric alcohol reacted with the dicarboxylic acid in the first reaction stage will be between about 0.7 mol and about 1.5 mols of the dihydric alcohol for each mol of the dicarboxylic acid. Quantities below one mol of the dihydric alcohol lead to ultimate products of relatively high acid number and are used only when high acid number resins, which are of value in the preparation of aqueous dispersions or salts, are desired. For most purposes, between one mol and 1.3 mols of the dihydric alcohol are reacted with one mol of the dicarboxylic acid. A slight excess of the alcohol is desirable to obtain an ultimate product low in acid number.

When the first stage reactants have reached a desired acid number, the monohydric alcohol unsaturated rosin acid ester is added to the mixture. If desired, this ester may be preheated, for example, to 100-250° C. in order to speed the reaction. The resulting mixture is then heated to and at a temperature between about 200° C. and about 300° C., preferably between about 230° C. and about 270° C., until the product has reached the desired state. The quantity of unsaturated rosin acid ester introduced into the second stage reaction will be above 0.75 mol for each mol of alpha-beta unsaturated dicarboxylic acid used in the reaction in order to obtain the heat stability coupled with the high temperature curing property desired in the resin. Usually no more than three mols will be added and in most cases it is preferable to use between 0.95 and 1.5 mols of the rosin acid ester for each mol of the dicarboxylic acid. Where more than three mols of the rosin acid ester are incorporated in the resin, the effect is to plasticize the resin with very material softening thereof and elimination or partial elimination of the property of readily curing at high temperatures to an insoluble form.

The second stage reaction is continued by maintaining the reaction temperature until the cure time of the resulting mass is less than four minutes, preferably, between about 40 seconds and about 90 seconds, as measured on the product after cooling. The reaction is readily controlled by making cure time tests as it proceeds and allowing for a drop in cure time during cooling of the material. This drop is readily determined by experience with any given size mass and any given type of container in which the resin is permitted to cool. Usually the drop in curing time during cooling of the resin will not be in excess of 30 seconds. It will be appreciated that the reaction continues at an appreciable rate after heating has been discontinued only as long as the temperature of the mass remains above about 200° C. The acid number of the resin is decreased during the second stage of reaction to a value of less than about 50 and preferably to a value between about 5 and about 15. The time required for this stage may vary between about 0.25 and about 10 hours and in most cases will be between about 1 and about 6 hours.

It is usually desirable to sparge the resin during the last hour of the reaction with nitrogen, hydrogen, carbon dioxide or other inert gas at the reaction temperature to remove any readily volatile material which may be present. If desired, the product may be vacuum-distilled at the reaction temperature during the last two to three hours of reaction to remove monohydric alcohol rosin ester which is present in the dispersed state but which has not combined in the reaction. It is believed the unsaturated rosin acid ester combines with the alpha-beta unsaturated dicarboxylic acid molecule to the extent of at least one mol per mol of acid, and that an excess thereover is necessary for complete reaction of the double bonds of the dicarboxylic acid. An excess of the rosin acid ester is usually desirable in the product but may be removed by distillation where it is desired to increase the hardness of the final resin.

Reaction diluents such as inert petroleum hydrocarbon solvents or other inert solvents may be present if desired. However, they have no advantage other than reducing the power required for agitating the mixture. In many cases the reaction mixture is cloudy for a time showing the existence of two phases. However, agitation of the mixture in all cases leads to an ultimate single phase product.

The resinous products in accordance with this invention vary from balsams, i. e., highly viscous liquids, to hard resins. The melting point is affected chiefly by the particular dihydric alcohol utilized and the proportion of monohydric alcohol resin ester. Thus, for example, the resins prepared from ethylene glycol, maleic anhydride and methyl-rosin acid esters as illustrated in Example 1 have a drop melting point usually between about 60 and about 90° C. (70–80° C. for the proportions in Example 1). These resins are flexible, moderately hard and substantially non-tacky at room temperature. Similar resins prepared from diethylene glycol have a drop melting point between about 30 and about 70° C. These resins are flexible, soft and somewhat tacky at room temperatures. Similar resins made with triethylene glycol will usually have a drop melting point between about 20° C. and about 45° C. They are soft and highly tacky at room temperatures. In all cases increases in the quantity of monohydric alcohol-rosin acid ester beyond about 1.5 mols per mol of alpha-beta unsaturated dicarboxylic acid materially decrease the softening point.

The acid number of the product is below about 50 by the phenol red method and will be below about 25 unless it is desired to utilize the resin for the preparation of salts or aqueous dispersions. Normally, the acid number will be 5 to 15 by the phenol red method. The cure time will in all cases be less than four minutes and where a resin is in the soluble, fusible state, it will be above zero.

The resins in accordance with this invention are odorless, tasteless and highly resistant to greases and oils. They have high adhesion when applied from solvent solution or from the molten state to cellulosic materials, metals, glass, and synthetic resinous articles. The resins are substantially unreactive and usually are very low in content of double bonds as shown by thiocyanate values in most cases below 50 and usually about 10.

The resins in the uncured state are soluble in benzene, toluene, coal tar naphthas; methyl acetate, ethyl acetate, and similar ester solvents; acetone, methyl ethyl ketone and similar ketones. They are substantially insoluble in petroleum (aliphatic) hydrocarbons, in lower aliphatic alcohols, in paraffin base mineral oil, in fats and in waxes. They are compatible with nitrocellulose and casein and are compatible in films cast from solution with polyvinyl chloride, polyvinyl acetate chloride, chlorinated rubber, cellulose acetate propionate, cellulose acetate butyrate, methyl methacrylate polymers and melamine resins in a 1:1 ratio. They are compatible up to about 10% with cellulose acetate in films cast from solution or up to about 5% in films cast from the molten state. They are compatible with ethyl cellulose to the extent of about 3% resin but up to about 8% of ethyl cellulose may be incorporated in the molten resin. Formulation with cellulose derivatives raises the softening point of the resin and decreases tackiness. Although the resins are not soluble in waxes, small amounts of wax may be added to the resins with the effect of increasing the moisture-vaporproofness of the resin.

An outstanding characteristic of the resins in accordance with this invention is their substantially unlimited stability at elevated temperatures at which they are sufficiently fluid to be readily coated in the molten state, coupled with the property of curing at very high temperatures. The resins in all cases are readily coated from the molten state at below 150° C., for example, between about 110 and about 145° C. for the ethylene glycol-maleic anhydride-methyl rosin ester product. Unlike usual film-forming alkyd resins, they may be maintained in the fluid state for prolonged periods of time without curing and with substantially no increase in viscosity. For example, they are characterized by a heat stability of in excess of 16 hours at 150° C., i. e., they do not cure upon being heated at 150° C. for 16 hours. However, upon being heated at 200° C. or to a higher temperature below that of decomposition, they cure to an infusible, rubbery to hard-gelled state in which they are resistant to solvents, i. e., either insoluble or dispersible in strong solvents only upon milling or manipulation.

The property of curing may be utilized where an infusible, resistant coating is desired by coating the resin in its thermoplastic state and then heating the article coated at a curing temperature such as about 180–300° C., preferably, 200 to 250° C. until the coating becomes cured.

A useful, infusible, gelled resinous material may be prepared in the initial preparation reaction by continuing the second stage reaction at above 180° C. and preferably at 200–300° C. until the cure time is zero, if desired, maintaining the temperature at above about 180° C. for up to about two hours more. In practical operation this may be accomplished by continuing the heating until the cure time is quite low, i. e., below about 30 seconds and then transferring the molten mixture from the reaction kettle to containers in which the reaction is continued. Reaction is continued by applying heat further or by retaining the material in large masses or by insulating the containers so that the retained heat carries the reaction past a zero cure time to the gelled state. Thus, Examples 1–5 modified by continuing the second stage reaction at 240° C. or at 250° C. to a 15 second cure time, then transferring the resin to a container, maintaining the temperature therein at substantially the same level to a zero cure time, and then cooling over a 45 minute period to 150° C. provide examples of preparation of the gelled resins. The product so obtained is tough, elastic, flexible and rubbery in nature, although harder than rubber, pliant at elevated temperatures below its decomposition point and can be handled on heated roll mills and calendered on cloth in much the same manner as rubber. Diethylene glycol-maleic anhydride-methyl abietate gelled resins according to this invention are particularly rubbery.

Soluble resins in accordance with this invention may be used for coating, in general, from either solvent solution or from the molten state, the latter being preferable. The resin may be used alone or may be combined with cellulose derivatives and other resins such as those mentioned hereinabove as compatible therewith. Insoluble metal soaps such as calcium stearate may be added, for example, to the extent of 5 to 15% to eliminate tackiness or tendency to block. The addition of waxes has a similar effect. Coatings of the resin are particularly useful on flexible webs such as paper, regenerated cellulose, cellulose derivative films, felts and woven textiles to which they may be applied by calendering or molten coating. Such webs may also be impregnated with the resin from molten baths or solvent solutions with the effect of sizing and increasing the strength of the web. By using a large excess of impregnating and coating material, impervious sheeting such as varnished cloths may be prepared. For example, cambric passed through a viscous molten mixture comprising 84% of the resin in accordance with Example 1, 10% of methyl hydroabietate, 3% of calcium stearate, and 3% of butyl stearate upon cooling was impervious but flexible. Several layers of this material pressed together at 240° C. became laminated into heavy sheeting which cured to an infusible, insoluble sheeted mass suitable for gaskets. The resins in accordance with this invention are useful as bases for printing inks, preferably applied in solution in a slowly volatile solvent. The printed matter may be heated at 180–300° C. to cure the resin in the coating if desired.

The resistant, infusible cured resin prepared by continuing the heating in preparation is useful as an extender in rubber and rubber-like compositions and as a binder in floor and tile compositions, for example, linoleum compositions containing cork. The cured material is handled like rubber on roll mills heated to 50–200° C. Masses thereof may be plasticized with uncured resin in accordance with this invention and may be coated therewith by calendering. The uncured resins in accordance with this invention serve as plasticizers in plastic masses of rubber and synthetic rubber, and of gelled resins and vulcanized organic materials generally, in which they greatly improve the cohesion and adhesive properties of the mass as required in coating by calendering. However, the gelled resins may be calendered onto paper, felt, wood plys, cloth and the lie in substantially unmodified form or in a simple formulation such as one containing 55% resin per Example 4 gelled by further reaction to a zero cure time and for 20 minutes more at 240° C., 20% TiO$_2$ pigment, 22% Celite (diatomaceous earth) and 3% aluminum stearate, milled to a uniform mass.

The resins have a refractive index close to that of cellulose (about 1.531 for ethylene glycol-maleic acid-methyl rosin ester product) and hence are effective in transparentizing paper. For example, paper may be impregnated in a solvent solution or molten bath at 150° C. of a mixture consisting of 92% of the resin of Example 1, 4% calcium stearate and 4% ethyl cellulose.

Coatings are heat sealing in the case of the harder resins and are pressure sensitive in the case of the softer resins, thus permitting the resins to be highly effective as adhesives.

The present invention includes within its scope articles coated with the resin and particularly flexible webs such as paper and cloth coated therewith. The coatings may be left in the soluble, fusible state or may be cured in situ to the gelled, infusible state. The coated articles include coated laminates and laminated articles held together by adhesive coatings comprising the resins in accordance with this invention. Thus, wood veneers or sheets may be coated with the resin from molten baths or by calendering and the sheets pressed together with the aid of heat to form a plywood. Continued heating at 200–300° C. renders the resinous binder unaffected by heat and solvents.

The resins in accordance with this invention may also be utilized in lacquers based on cellulose derivatives, on chlorinated rubber, vinyl resins and other film-forming materials. The resins impart grease-resistance, adhesion, and are particularly valuable in imparting resistance to cold-checking in furniture lacquers. A typical wood lacquer contains 30 parts of nitrocellulose, 10 parts of dibutyl phthalate and 60 parts of the resin prepared as in Example 1, the mixture being dissolved in equal parts of butyl acetate and toluene.

Where in the specification and claims reference is made to the phenol red method for determining acid number, it will be understood that the acid number is determined in accordance with the following procedure: Two to three grams of material are weighed to the nearest 0.001 gram into a 250 milliliter Erlenmeyer flask and dissolved therein in 60 milliliters of acetone, 30 milliliters of ethyl alcohol and six drops of phenol red indicator solution (1% phenol red in alcohol). The acetone-alcohol solution is titrated to a pink endpoint with standardized alcoholic potassium hydroxide solution of a normality factor of approximately 0.6. The acid number is calculated as follows:

$$\text{Acid No.} = \frac{\text{Milliliters KOH solution} \times \text{N. F.} \times 56.1}{\text{Weight of sample}}$$

where N. F. is the normality factor of the petroleum hydroxide solution.

Where in the specification and claims the expression "cure time" is used, it will be understood to refer to the time required to render a small particle of the resin referred to infusible at 200° C. by the following procedure: A small part or drop of the resin of a size no larger than the head of an ordinary pin is picked up by the point of a sharpened nail. The nail carrying the resin particle is drawn across a metal plate maintained at a temperature of 200° C.±2° C., making a shiny streak of wet molten resin on the plate best observed by viewing in line with light reflected therefrom. The nail is then wiped clean and repeatedly drawn lengthwise along the wet streak. Initially, the nail has no effect on the streak as the wet resin flows together immediately behind the nail. However, after a time the wet resin sets and does not flow together to maintain the shiny wet streak, i. e., the nail leaves a mark in the previously wet streak. The time required for the wet streak to reach the point at which it sets in this manner, measured from the time the resin is applied to the hot plate, is the cure time. A cure time of in excess of five minutes is indicative of a material which cannot be cured by heat since any material requiring more than five minutes to become gummy under the conditions of the test cures, if at all, by oxidation rather than by simple heating. If the resin acts as a jelly on the hot plate initially, the cure time is considered zero.

What I claim and desire to protect by Letters Patent is:

1. A resinous reaction product of a partially reacted alpha-beta-unsaturated dicarboxylic acid-dihydric alcohol ester which has been preformed and reacted to a phenol red acid number between 30 and 150 and which has a reacted content of 0.7 to 1.5 moles dihydric alcohol per mole of dicarboxylic acid, and from above 0.75 to 3 moles per mole of said dicarboxylic acid in the ester of a monohydric alcohol ester of unsaturated rosin acid, said monohydric alcohol and said dihydric alcohol possessing only radicals substantially inert in the reaction and uncombined in the product otherwise than through their hydroxyl linkages, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted dihydric alcohol ester and less than 50, by substantial stability to heat at temperatures below 150° C., by the capacity to be cured to an infusible state by heat at above 200° C., and by a cure time at 200° C. of less than four minutes.

2. A resinous reaction product of a partially reacted aliphatic glycol-maleic ester which has been preformed and reacted to a phenol red acid number between 30 and 150 and which has a reacted content of 0.7 to 1.5 moles of the glycol per mole of maleic acid in the ester, and from above 0.75 to 3 moles per mole of maleic acid in the said ester of a methyl ester of unsaturated rosin acid, said aliphatic glycol possessing only radicals substantially inert in the reaction and uncombined in the product otherwise than through their hydroxyl linkages, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted maleic ester and less than 50, by substantial stability to heat at temperatures below 150° C., by the capacity to be cured to an infusible state by heat at above 200° C., and by a cure time at 200° C. of less than four minutes.

3. A resinous reaction product of a partially reacted alpha-beta-unsaturated dicarboxylic acid-dihydric alcohol ester which has been preformed and reacted to a phenol red acid number between 30 and 150 and which has a reacted content of 1.0 to 1.3 moles dihydric alcohol per mole of dicarboxylic acid, and 0.95 to 1.5 moles per mole of said dicarboxylic acid in the ester of a monohydric alcohol ester of unsaturated rosin acid, said monohydric alcohol and said dihydric alcohol possessing only radicals substantially inert in the reaction and uncombined in the product otherwise than through their hydroxyl linkages, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted dihydric alcohol ester and less than 50, by substantial stability to heat at temperatures below 150° C., by the capacity to be cured to an infusible state by heat at above 200° C., and by a cure time at 200° C. of less than four minutes.

4. A resinous reaction product of a partially reacted dihydric alcohol-maleic ester which has been preformed and reacted to a phenol red acid number between 30 and 150 and which has a reacted content of 1.0 to 1.3 moles dihydric alcohol per mole of maleic acid in the ester, and 0.95 to 1.5 moles per mole of maleic acid in the ester of a monohydric alcohol ester of unsaturated rosin acid, said monohydric alcohol and said dihydric alcohol possessing only radicals substantially inert in the reaction and uncombined in the product otherwise than through their hydroxyl linkages, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted dihydric alcohol ester and less than 50, by substantial stability to heat at temperatures below 150° C., by the capacity to be cured to an infusible state by heat at above 200° C., and by a cure time at 200° C. of less than four minutes.

5. A resinous reaction product of a partially reacted dihydric alcohol-fumaric acid ester which has been preformed and reacted to a phenol red acid number between 30 and 150 and which has a reacted content of 1.0 to 1.3 moles dihydric alcohol per mole of fumaric acid, and 0.95 to 1.5 moles per mole of fumaric acid in the ester of a monohydric alcohol ester of unsaturated rosin acid, said monohydric alcohol and said dihydric alcohol possessing only radicals substantially inert in the reaction and uncombined in the product otherwise than through their hydroxyl linkages, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted dihydric alcohol ester and less than 50, by substantial stability to heat at temperatures below 150° C., by the capacity to be cured to an infusible state by heat at above 200° C., and by a cure time at 200° C. of less than four minutes.

6. A resinous reaction product of a partially reacted ethylene glycol-maleic ester which has been preformed and reacted to a phenol red acid number between 30 and 150 and which has a reacted content of 1.0 to 1.3 moles of the glycol per mole of maleic acid in the ester, and 0.95 to 1.5 moles per mole of maleic acid in the ester of a methyl ester of unsaturated rosin acid, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted maleic ester and less than 50, by substantial stability to heat at temperatures below 150° C., by the capacity to be cured to an infusible state by heat at above 200 C., and by a cure time at 200° C. of less than four minutes.

7. A resinous reaction product of a partially reacted diethylene glycol-maleic ester which has been preformed and reacted to a phenol red acid number between 30 and 150 and which has a reacted content of 1.0 to 1.3 moles of the glycol per mole of maleic acid in the ester, and 0.95 to 1.5 moles per mole of maleic acid in the ester of a methyl ester of unsaturated rosin acid, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted maleic ester and less than 50, by substantial stability to heat at temperatures below 150° C., by the capacity to be cured to an infusible state by heat at above 200° C., and by a cure time at 200° C. of less than four minutes.

8. A resinous reaction product of a partially reacted ethylene glycol-fumaric ester which has been preformed and reacted to a phenol red acid number between 30 and 150 and which has a reacted content of 1.0 to 1.3 moles of the glycol per mole of fumaric acid in the ester, and 0.95 to 1.5 moles per mole of fumaric acid in the ester of a methyl ester of unsaturated rosin acid, said resinous reaction product being formed by condensation reaction of said esters at about 200° C. to about 300° C., reaction being continued until achievement of acid number and cure time values hereinafter specified, said resinous reaction product being characterized by fusibility, by solubility in benzene and ethyl acetate, by a phenol red acid number less than that of the partially reacted fumaric ester and less than 50, by substantial stability to heat at temperatures below 150° C., by the capacity to be cured to an infusible state by heat at above 200° C., and by a cure time at 200° C. of less than four minutes.

9. An article having a coating comprising a resin in accordance with claim 1.

10. A laminated element having a coating of adhesive composition comprising a resin in accordance with claim 3.

11. A flexible, fibrous web with a coating comprising a resin in accordance with claim 3.

12. A process for preparing synthetic resins which comprises heating together an alpha-beta-unsaturated dicarboxylic acid and a dihydric alcohol in a quantity of 0.7–1.5 moles of the alcohol per mole of the acid until there is formed a partially reacted ester with a phenol red acid number between 30 and 150, and then heating this ester with from above 0.75 to 3.0 moles per mole of the dicarboxylic acid of a monohydric alcohol ester of unsaturated rosin acid at a temperature between about 200° C. and about 300° C. until there is formed a resin having an acid number lower than that of the partially reacted dihydric alcohol ester and lower than 50, and a cure time at 200° C. of less than four minutes determined after cooling of the reaction mass, the said dihydric and monohydric alcohols possessing only radicals substantially inert in the reaction and uncombined in the product otherwise than through their hydroxyl linkages.

13. A process for preparing synthetic resins which comprises heating together an alpha-beta-unsaturated dicarboxylic acid and a dihydric alcohol in a quantity of 0.7–1.5 moles of the alcohol per mole of the acid until there is formed a partially reacted ester with a phenol red acid number between 30 and 150, and then heating this ester with from above 0.75 to 3.0 moles per mole of the dicarboxylic acid of a monohydric alcohol ester of unsaturated rosin acid at a temperature between about 200° C. and about 300° C. until there is formed a resin having an acid number lower than that of the partially reacted dihydric alcohol ester and lower than 50, and a cure time at 200° C. of less than four minutes determined after cooling of the reaction mass, the reaction mixture being subjected to vacuum distillation during a period in the latter part of the condensation reaction to remove volatile, distillable material present, the said dihydric and monohydric alcohols possessing only radicals substantially inert in the reaction and uncombined in the product otherwise than through their hydroxyl linkages.

14. A process for preparing synthetic resins which comprises heating together an alpha-beta-unsaturated dicarboxylic acid and a dihydric alcohol in a quantity of 1.0–1.3 moles of the alcohol per mole of the acid until there is formed a partially reacted ester with a phenol red acid number between 30 and 150, and then heating this ester with 0.95–1.5 moles per mole of the dicarboxylic acid of a monohydric alcohol ester of unsaturated rosin acid at a temperature between about 200° C. and about 300° C. until there is formed a resin having an acid number lower than that of the partially reacted dihydric alcohol ester and lower than 50, and a cure time at 200° C. of less than four minutes determined after cooling of the reaction mass, the said dihydric and monohydric alcohols possessing only radicals substantially inert in the reaction and uncombined in the product otherwise than through their hydroxyl linkages.

15. A process for preparing synthetic resins which comprises heating together maleic anhydride and a dihydric alcohol in a quantity of 1.0 to 1.3 moles of the alcohol per mole of maleic anhydride until there is formed a partially reacted ester with a phenol red acid number between 30 and 150, and then heating this ester with 0.95 to 1.5 moles per mole of the maleic anhydride of a monohydric alcohol ester of unsaturated rosin acid at a temperature between about 200° C. and about 300° C. until there is formed a resin having an acid number lower than that of the partially reacted dihydric alcohol ester and lower than 50, and a cure time at 200° C. of less than four minutes determined after cooling of the reaction mass, the said dihydric and monohydric alcohols possessing only radicals substantially inert in the reaction and uncombined in the product otherwise than through their hydroxyl linkages.

16. A process for preparing synthetic resins which comprises heating together an aliphatic glycol and maleic anhydride in a quantity of 1.0 to 1.3 moles of the glycol per mole of the maleic anhydride until there is formed a partially reacted ester with a phenol red acid number between 30 and 150, and then heating this ester with 0.95 to 1.5 moles per mole of maleic anhydride of a methyl ester of unsaturated rosin acid at a temperature between about 200° C. and about 300° C. until there is formed a resin having an acid number lower than that of the partially reacted glycol ester and lower than 50, and a cure time at 200° C. of less than four minutes determined after cooling of the reaction mass, the said glycol possessing only radicals substantially inert in the reaction and uncombined in the product otherwise than through its hydroxyl linkages.

17. A process for preparing synthetic resins which comprises heating together an aliphatic glycol and fumaric acid in a quantity of 1.0 to 1.3 moles of the glycol per mole of the fumaric acid until there is formed a partially reacted ester with a phenol red acid number between 30 and 150, and then heating this ester with 0.95 to 1.5 moles per mole of fumaric acid of a methyl ester of unsaturated rosin acid at a temperature between about 200° C. and about 300° C. until there is formed a resin having an acid number lower than that of the partially reacted glycol ester and lower than 50, and a cure time at 200° C. of less than four minutes determined after cooling of the reaction mass, the said glycol possessing only radicals substantially inert in the reaction and uncombined in the product otherwise than through its hydroxyl linkages.

18. A process for preparing synthetic resins which comprises heating together an alpha-beta-unsaturated dicarboxylic acid and a dihydric alcohol in a quantity of 0.7–1.5 moles of the alcohol per mole of the acid until there is formed a partially reacted ester with a phenol red acid number between 30 and 150, and then heating this ester with from above 0.75 to 3.0 moles per mole of the dicarboxylic acid of a monohydric alcohol ester of unsaturated rosin acid at a temperature between about 200° C. and about 300° C. until there is formed a resin having an acid number lower than that of the partially reacted dihydric alcohol ester and lower than 50, and a cure time at 200° C. of less than four minutes determined after cooling of the reaction mass, and subjecting the resin so obtained to further heating at above about 180° C. until the resin achieves an elastic, infusible, gelled state, the said dihydric and monohydric alcohols possessing only radicals substantially inert in the reaction and uncombined in the product otherwise than through their hydroxyl linkages.

GEORGE SPILLER.